March 15, 1932. L. L. BEURRIER 1,849,564
LINKAGE DEVICE
Filed March 29, 1930
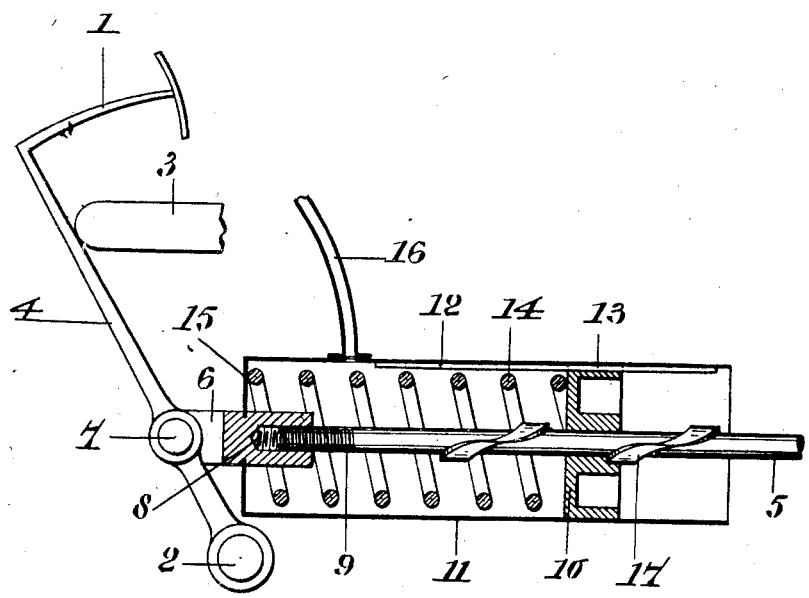
Inventor:-
Leon Louis Beurrier
by
Attys.

Patented Mar. 15, 1932

1,849,564

UNITED STATES PATENT OFFICE

LÉON LOUIS BEURRIER, OF LEVALLOIS-PERRET, FRANCE

LINKAGE DEVICE

Application filed March 29, 1930, Serial No. 440,129, and in France April 8, 1929.

The present invention relates to a linkage device which is chiefly adapted for vehicle brakes, but which may be employed with all mechanism whose operation takes place in two steps: (1) a step in which the clearance in the linkage is taken up; (2) a step in which the driving force is exercised.

Such mechanism usually comprises a suitable linkage such as rod-and-link gear, or cable, which is moved lengthwise by a lever to which the driving force is applied.

In conformity to the invention, I insert into the linkage, and for instance between two parts of the rod-and-link gear, a screw and nut arrangement of such nature that its rotation will vary the length of the linkage. Before exercising any driving force, the said screw and nut arrangement is operated by pneumatic means, by which the clearance in the linkage will be automatically taken up. The power is then applied, and when this power is removed, the said screw and nut arrangement is actuated in the contrary direction in order to provide the necessary clearance for the linkage.

With this disposition, a much greater force can be employed, and in the case of braking of vehicles, no servo-brake will be needed. In fact, with the direct-acting brakes, a considerable part of the travel of the operation lever serves to take up the clearance in the linkage; but according to the invention, the clearance is automatically taken up, and the whole travel of the operating lever is employed for power purposes. Hence the apparatus will afford a greater linkage leverage or a mechanical advantage.

For use upon motor vehicles, the source of power may consist of a piston movable in a cylinder which is connected to the engine suction. The lengthwise motion of the piston can be converted into a rotary motion by a screw thread, and preferably a quick thread, upon the said piston.

In a preferred arrangement, a rod pertaining to the rod-and-link gear is provided with a quick thread, and it traverses the piston. On the other hand, the end of said rod is secured to one part of the said screw and nut device, and this device will thus be actuated during the lengthwise travel of the piston.

The cylinder containing the piston is preferably connected to the suction of the engine, also providing a spring adapted to drive the piston in the contrary direction to the one which is due to the engine suction, and thus when the accelerator pedal is released by the foot, the engine suction will attract the piston, thus taking up the clearance, and the apparatus is now ready for the braking action. When the driver again uses the accelerator pedal, the suction diminishes, and the spring drives back the piston, thus allowing the proper clearance in the linkage. In this manner, the clearance in the linkage is taken up when the accelerator pedal is released, and this clearance is again allowed when the said pedal is employed.

The following description, together with the accompanying drawing which is given by way of example, relates to an embodiment of the invention as applied to brake control for motor vehicles.

Herein, the brake pedal 1 is pivoted on an axle 2 and it cooperates with a stop 3 by which its back motion is limited.

The device according to the invention is mounted between the lever arm 4 of said pedal and the rod 5 which imparts the effort to the linkage controlling the brakes. For this purpose, a forked bracket 6, mounted by means of an axle 7 upon the arm 4, has a tapped hole 8; said bracket serves as a nut for the threaded end of a rod 5. The screw and nut device thus formed by said members 6 and 9 thus serves to vary the length of the linkage.

A piston 10 is mounted in a cylinder 11 which is secured to said forked bracket 6; said piston can move lengthwise in the cylinder but is held against rotation by a key 12 secured to said cylinder and cooperating with a slot 13 in the piston.

In the center of the piston is a tapped hole traversed by a rod 5 which is provided at this part with a quick thread 17. A spiral spring 14 bears against the closed end of the cylinder 11 and urges said piston 10 to the right. The cylinder 11 is connected by a pipe 16 to the suction conduit of the engine of the vehicle, at a point between the gas throttle and the engine cylinders.

The operation is as follows.

When the driver releases his accelerating pedal (not shown) that is, the pedal for the throttle, this latter now closes. As the engine continues to rotate, a suction or vacuum is produced in the pipe between the valve and the cylinder; this suction is imparted to the cylinder 11 by pipe 16; the piston 10 is thus moved to the left; it is thus displaced lengthwise and rotates the rod 5, so that the part 9 is screwed into the nut 6.

Due to the rotation of the said rod and its threaded part, the said rod is drawn to the left. The size of the various parts is such that the force upon the rod 5 will be near 50 kgs., and thus the rod will turn until the clearance in the linkage is taken up, and this movement will produce no braking action. If the driver now desires to brake the vehicle, he uses his pedal 1, and since there is no clearance in the linkage, he will be able to exert a braking effort of 500 kgs. or the like.

When he again presses the accelerating pedal, the gas throttle opens, and the suction in the pipe 16 is reduced. The spring 14 then drives the piston 10 to the right, thus turning the rod 5 in the contrary direction to the preceding. Thus the rotation due to the threaded rod and nut 6—9 will again provide the necessary clearance for the linkage.

The action of the piston 10 upon the rod 5 comprises a couple or torque and a longitudinal force; thus when the piston moves to the left, the torque tends to rotate the rod 5, and the force tends to move the said rod in the same direction as the piston, that is, to the left, and hence the force is exerted in the direction in which the rod travels, so that the pressure of the threads 9 on the nut 6 is reduced. The force required for the rotation is therefore reduced.

The rotation due to the threaded rod and nut may be used not only to take up the clearance, which is always its chief purpose, but also to exercise a certain part of the positive action. For instance, in the braking of vehicles, the power of the auxiliary mechanism can be so calculated that after the clearance has been taken up, it will slightly apply the brake shoes upon their drums. This affords a factor of safety in the case in which the linkage offers an abnormal resistance while the clearance is being taken up, and on the other hand, the foot will have a reduced amount of motion.

Having now particularly described and ascertained the nature of my invention and in what manner the same is to be performed, I declare that what I claim is:

1. Brake mechanism comprising a pedal, a brake rod system, a slow pitch screw and nut system connecting the pedal to the rod, a rapid pitch screw and nut system arranged so as to control the slow screw and nut system and means to actuate the rapid screw and nut system.

2. Brake apparatus for motor vehicles with a suction passage comprising a pedal, a brake rod, a slow screw and nut system connecting the pedal to the rod, a rapid pitch screw arranged so as to actuate the slow pitch screw and nut system, a cylinder, a nut mounted on the rapid pitch screw, which nut forms a piston in the cylinder, means for preventing said nut from rotating and a passage connecting the cylinder with the intake manifold of the motor.

3. Brake apparatus comprising a pedal, a brake rod, a slow pitch threaded portion on said rod, which threaded part is engaged with the slow pitch nut, a rapid pitch threaded portion on said rod, the rapid pitch threading being in the direction opposite that of the slow pitch threading, a nut on the rapid pitch threading part, and a cylinder which encompasses the nut so that the latter forms a piston.

4. Brake mechanism for motor vehicle with a suction passage comprising a brake rod, a slow pitch screw and nut system, the rotation of which varies the length of the brake rod, a chamber connected to the suction passage, a piston cooperating with said chamber, means to prevent the rotation of said piston, a rod which traverses said piston, said rod being connected to the screw and nut system, said rod carrying a rapid pitch threading, the direction of which is such that when the piston moves in the direction of the force to be exerted, the slow pitch screw and nut system rotates in the direction corresponding to the braking.

In testimony whereof I have signed this specification.

LÉON LOUIS BEURRIER.